United States Patent
Ichimei et al.

(10) Patent No.: US 11,586,061 B2
(45) Date of Patent: *Feb. 21, 2023

(54) OPTICAL WAVEGUIDE DEVICE, AND OPTICAL MODULATION DEVICE AND OPTICAL TRANSMISSION DEVICE USING SAME

(71) Applicant: SUMITOMO OSAKA CEMENT CO., LTD., Tokyo (JP)

(72) Inventors: Hideki Ichimei, Tokyo (JP); Kei Kato, Tokyo (JP); Norikazu Miyazaki, Tokyo (JP)

(73) Assignee: SUMITOMO OSAKA CEMENT CO., LTD., Tokyo (JP)

( * ) Notice: Subject to any disclaimer, the term of this patent is extended or adjusted under 35 U.S.C. 154(b) by 106 days.

This patent is subject to a terminal disclaimer.

(21) Appl. No.: 17/212,971

(22) Filed: Mar. 25, 2021

(65) Prior Publication Data

US 2021/0302765 A1 Sep. 30, 2021

(30) Foreign Application Priority Data

Mar. 31, 2020 (JP) .............. JP2020-062129

(51) Int. Cl.
*G02F 1/035* (2006.01)
*G02F 1/03* (2006.01)

(52) U.S. Cl.
CPC ............ *G02F 1/035* (2013.01); *G02F 1/0327* (2013.01)

(58) Field of Classification Search
CPC ............................. G02F 1/035; G02F 1/0327
See application file for complete search history.

(56) References Cited

U.S. PATENT DOCUMENTS

| | | | |
|---|---|---|---|
| 11,402,594 B2* | 8/2022 | Kato | G02B 6/4432 |
| 2016/0011377 A1 | 1/2016 | Okamura et al. | |
| 2017/0299813 A1 | 10/2017 | Hara et al. | |
| 2018/0231866 A1* | 8/2018 | Sugamata | G02F 1/2252 |
| 2018/0284352 A1* | 10/2018 | Miyazaki | G02B 6/2773 |
| 2021/0302765 A1* | 9/2021 | Ichimei | G02F 1/0311 |

FOREIGN PATENT DOCUMENTS

| | | |
|---|---|---|
| JP | 2014-163993 A | 9/2014 |
| JP | 2016-212127 A | 12/2016 |
| JP | 2020-003701 A | 1/2020 |

* cited by examiner

*Primary Examiner* — Tina M Wong
(74) *Attorney, Agent, or Firm* — IpHorgan Ltd.

(57) ABSTRACT

An optical waveguide device includes a substrate on which an optical waveguide is formed, and a reinforcing block disposed on the substrate, along an end surface of the substrate on which an input portion or an output portion of the optical waveguide is disposed, in which an optical component that is joined to both the end surface of the substrate and an end surface of the reinforcing block is provided, a material used for a joining surface of the optical component and a material used for the substrate or the reinforcing block have at least different linear expansion coefficients of a direction parallel to the joining surface, and an area of the joining surface is set to be smaller than a maximum value of a total of areas of cross sections of the substrate and the reinforcing block parallel to the joining surface.

7 Claims, 6 Drawing Sheets

OPTICAL WAVEGUIDE DEVICE, AND OPTICAL MODULATION DEVICE AND OPTICAL TRANSMISSION DEVICE USING SAME

CROSS-REFERENCE TO RELATED APPLICATIONS

This application claims the benefit of Japanese Patent Application No. 2020-062129 filed Mar. 31, 2020, the disclosure of which is herein incorporated by reference in its entirety.

BACKGROUND OF THE INVENTION

Field of the Invention

The present invention relates to an optical waveguide device, and an optical modulation device and an optical transmission device using the same, and in particular, relates to an optical waveguide device including a substrate on which an optical waveguide is formed, and a reinforcing block disposed on the substrate, along an end surface of the substrate where an input portion or an output portion of the optical waveguide is disposed.

Description of Related Art

In the fields of optical measurement technology and optical communication technology, optical waveguide devices using a substrate on which an optical waveguide is formed, such as an optical modulator, are often used. An optical modulation element (LN chip) is formed by forming a control electrode for controlling the light wave propagating through the optical waveguide on the optical waveguide device using a substrate having an electro-optic effect such as lithium niobate (LN). Since the LN chip is mounted in a case made of metal or the like, and inputs or outputs light waves to or from the optical waveguide of the optical waveguide device, the optical lens is adhesively fixed to the end surface of the optical waveguide device.

By using an optical lens, it is possible to provide an optical modulator having good coupling efficiency between input light or output light and an optical waveguide. Even when the mounting positions of the LN chip and the case are displaced, it is possible to realize a configuration with low insertion loss by adjusting the position and angle of the lens.

FIG. 1 shows an example of an optical modulator having a polarization combiner function as in Japanese Laid-Open Patent Publication No. 2014-163993 and Japanese Laid-Open Patent Publication No. 2016-212127. An optical waveguide 2 and a modulation electrode (not shown) that modulates a light wave propagating through the optical waveguide are formed on the substrate 1. Two sets of nested optical waveguides in which Mach-Zehnder type optical waveguides are disposed in a nested structure are used for the optical waveguide 2.

Further, in FIG. 1, a single-polarized light wave is input from the optical fiber F1 through the optical lens 11, split into two light waves by the beam splitter 5, and then introduced in the input portion of the optical waveguide 2 via the optical lens 30. Further, a polarization plane of one of the two light waves output from the optical waveguide 2 via the optical lens 40 is rotated by the wave plate 6, and the two light waves are combined by the polarization beam combiner 7, and then introduced into the optical fiber F2 via the optical lens 12. Reference numerals 91 and 92 are optical windows provided in the side surfaces of the case 8 in order to ensure the airtightness of the case.

An optical block 3 (4) holding the optical lens 30 (40) (or which is integrally molded with the optical lens) is attached to the end surface of the substrate 1 by using an adhesive. Further, the upper portion of the end surface of the substrate 1 is attached to the reinforcing block which increases the adhesive strength between the optical block and the substrate 1 by increasing the adhesion area of the end surface, and increases the mechanical strength of the end surface of the substrate 1.

As shown in Japanese Laid-Open Patent Publication No. 2020-003701, in recent years, a configuration has been proposed in which in an optical modulation device having an optical waveguide device mounted in a case, an input portion and an output portion of the optical waveguide 2 are disposed on one side surface of the optical waveguide device, as shown in FIG. 2, so as to input and output light waves from one side surface of the case. An optical block 3 holding an optical lens (31, 32) is attached to one side surface of such an optical waveguide device. FIG. 3 is a view seen from the side direction showing a state in which the optical waveguide device (substrate 1) and the optical block 3 are attached, and the reinforcing block 10 is adhesively fixed to the upper portion of the substrate 1 on the end surface side by an adhesive (not shown). Further, the optical block 3 is adhesively fixed to the end surfaces of the substrate 1 and the reinforcing block 10 by an adhesive A.

The optical block is not limited to one holding the optical lens as described above, and one integrally holding other optical members such as a reflecting member and a polarizer. Further, the optical component to be adhesively fixed to the substrate 1 and the reinforcing block 10 is not limited to the optical block, but a configuration in which an optical fiber fixed to a sleeve-type (cylindrical) holding member or a V-groove substrate is directly attached to the end surface of the substrate 1 is also included.

A ferroelectric material such as LN is used as the substrate constituting the optical waveguide device, and a material such as LN is also used for the reinforcing block in order to match the linear expansion coefficient with that of the substrate 1. On the other hand, glass (organic glass, optical glass, or the like) and plastic are used as the material of the optical component. Therefore, the linear expansion coefficient of the substrate or the reinforcing block and the optical block may differ by $5 \times 10^{-6}/°$ C. or more.

The size of the optical waveguide device is such that the chip width is about 0.5 to 3 mm, and the total thickness of the reinforcing block and the substrate of the optical waveguide device is about 1 to 2 mm. In particular, in the case of a plurality of Mach-Zehnder structure as shown in FIG. 1 or a folded structure in which input and output are on the same end surface as shown in FIG. 2, the chip width is greater than 1.5 mm and the adhesion area of the optical block 3 and the substrate 1 becomes larger, so that it is easily affected by the difference in the linear expansion coefficient between the substrate or the reinforcing block and the optical block.

When the temperature of the optical waveguide device itself or the environmental atmosphere changes, internal stress is generated on the joining surface between the substrate or the reinforcing block and the optical block, due to the difference in the linear expansion coefficient described above. When the generated stress is large or the joining surface is fatigue-deteriorated due to stress changes due to repeated temperature changes, the optical components held by the optical block shift from the optimum position and the loss increases. In the worst case, the optical block causes an adverse effect such as falling off from the end surface of the optical waveguide device. Further, in the case of the plurality of Mach-Zehnder structure as shown in FIG. 1 or the folded structure in which input and output are on the same end surface as shown in FIG. 2, the adhesion area between the optical block 3 and the substrate 1 and the reinforcing block 10 becomes large and these problems become more prominent.

SUMMARY OF THE INVENTION

An object to be solved by the present invention is to solve the above-described problems and to provide an optical waveguide device in which the internal stress generated at the joining portion between the substrate or the reinforcing block and the optical block is reduced. Another object of the present invention is to provide an optical modulation device and an optical transmission device using the optical waveguide device.

In order to solve the above problems, an optical waveguide device, and an optical modulation device and an optical transmission device using the same of the present invention have the following technical features.

(1) Provided is an optical waveguide device including: a substrate on which an optical waveguide is formed; and a reinforcing block disposed on the substrate, along an end surface of the substrate on which an input portion or an output portion of the optical waveguide is disposed, in which an optical component that is joined to both the end surface of the substrate and an end surface of the reinforcing block is provided, a material used for a joining surface of the optical component and a material used for the substrate or the reinforcing block have at least different linear expansion coefficients of a direction parallel to the joining surface, and an area of the joining surface is set to be smaller than a maximum value of a total of areas of cross sections of the substrate and the reinforcing block parallel to the joining surface.

(2) In the optical waveguide device according to (1) above, a notch may be formed in the end surface of either the substrate or the reinforcing block, to reduce the area of the joining surface.

(3) In the optical waveguide device according to (2) above, a position where the notch is formed may be set such that a maximum width or a maximum thickness remains in a joining surface of the substrate or the reinforcing block.

(4) In the optical waveguide device according to (2) above, a position where the notch is formed may be set so as to reduce a width or a thickness of the substrate or the reinforcing block.

(5) Provided is an optical waveguide device including a substrate on which an optical waveguide is formed, and a reinforcing block disposed on the substrate, along an end surface of the substrate on which an input portion or an output portion of the optical waveguide is disposed, in which an optical component that is joined to both the end surface of the substrate and an end surface of the reinforcing block is provided, a material used for a joining surface of the optical component and a material used for the substrate have different linear expansion coefficients of a direction parallel to the joining surface, and a thickness of the reinforcing block is set to be thinner than a thickness of the substrate.

(6) In the optical waveguide device according to any one of (1) to (5) above, the substrate on which the optical waveguide is formed may be a joint body of a thin plate on which the optical waveguide is formed and a reinforcing substrate that supports the thin plate.

(7) Provided is an optical modulation device including: the optical waveguide device according to any one of (1) to (6) above, which includes an electrode that modulates a light wave propagating through the optical waveguide, and is housed in a case; and an optical fiber that inputs the light wave to the optical waveguide or outputs the light wave from the optical waveguide.

(8) The optical modulation device according to (7) above may further include an electronic circuit that amplifies a modulation signal to be input to the optical waveguide device inside the case.

(9) Provided is an optical transmission device including: the optical modulation device according to (7) or (8) above; and an electronic circuit that output a modulation signal for causing the optical modulation device to perform a modulation operation.

According to the present invention, an optical waveguide device includes a substrate on which an optical waveguide is formed, and a reinforcing block disposed on the substrate, along an end surface of the substrate on which an input portion or an output portion of the optical waveguide is disposed, in which an optical component that is joined to both the end surface of the substrate and an end surface of the reinforcing block is provided, a material used for a joining surface of the optical component and a material used for the substrate or the reinforcing block have at least different linear expansion coefficients of a direction parallel to the joining surface, (a) an area of the joining surface is set to be smaller than a maximum value of a total of areas of cross sections of the substrate and the reinforcing block parallel to the joining surface, or (b) a thickness of the reinforcing block is set to be thinner than a thickness of the substrate, so that the area of the joining surface can be reduced, and the internal stress acting on the joining surface can be reduced.

DETAILED DESCRIPTION OF THE INVENTION

Figure 1:
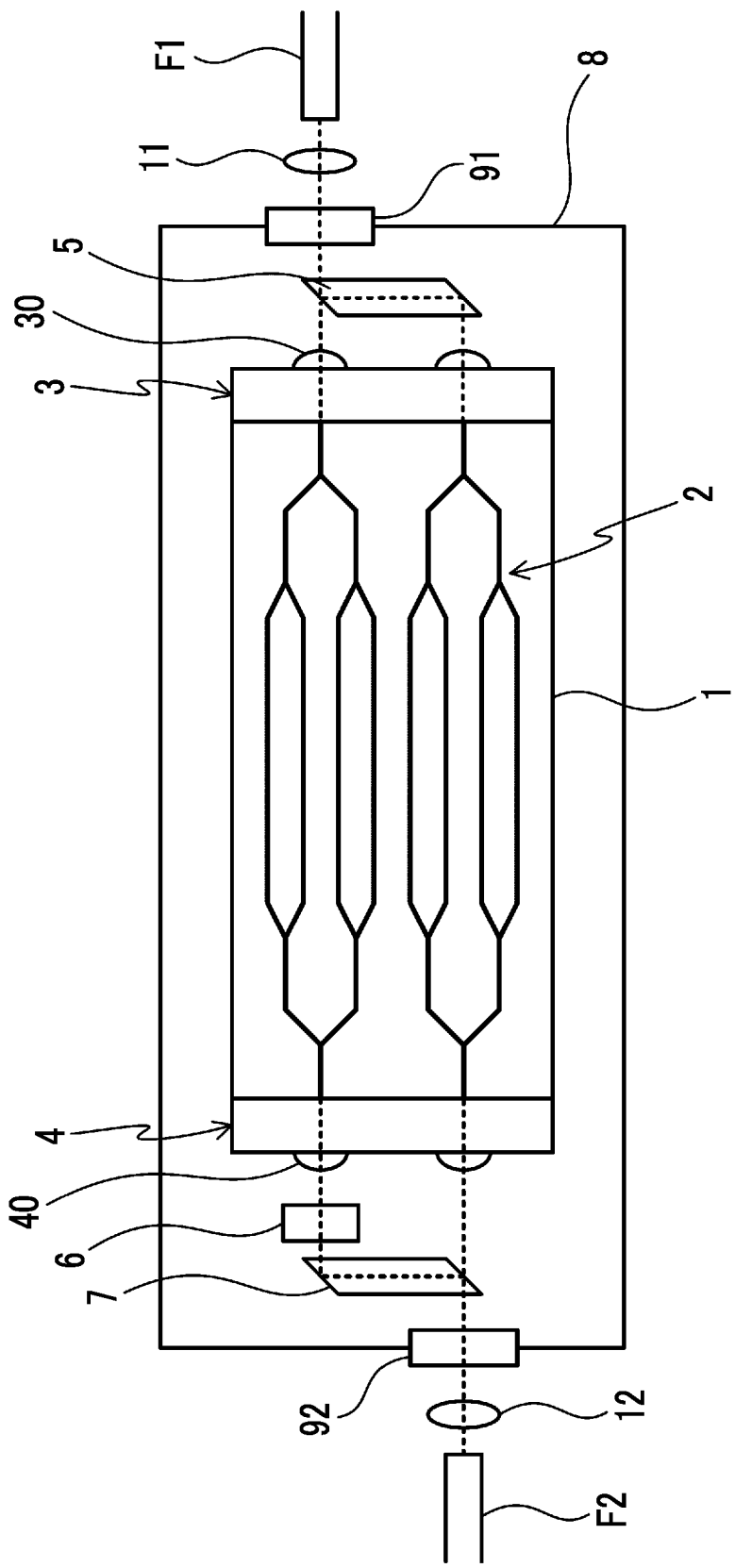
FIG. 1 is a plan view illustrating an example of an optical modulation device in the related art.
Figure 2:
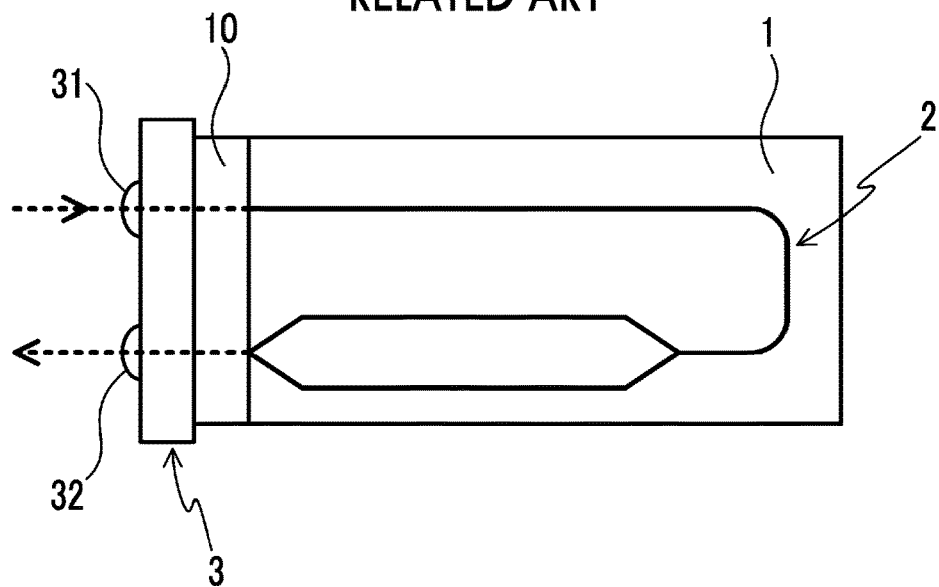
FIG. 2 is a plan view illustrating an example of an optical waveguide device in the related art.
Figure 3:
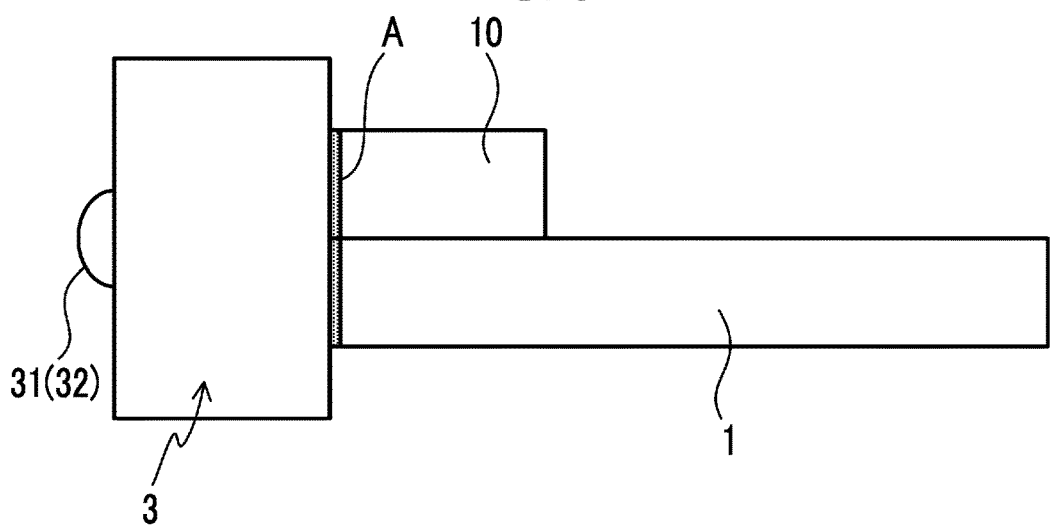
FIG. 3 is a side view of the optical waveguide device of FIG. 2.

Hereinafter, an optical waveguide device of the present invention will be described in detail with reference to suitable examples.

The optical waveguide device of the present invention, as shown in FIGS. 4 to 12, is an optical waveguide device including a substrate on which an optical waveguide is formed, and a reinforcing block disposed on the substrate, along an end surface of the substrate on which an input portion or an output portion of the optical waveguide is disposed, in which an optical component that is joined to both the end surface of the substrate and an end surface of the reinforcing block is provided, a material used for a joining surface of the optical component and a material used for the substrate or the reinforcing block have at least different linear expansion coefficients of a direction parallel to the joining surface, (a) an area of the joining surface is set to be smaller than a maximum value of a total of areas of cross sections of the substrate and the reinforcing block parallel to the joining surface, or (b) a thickness of the reinforcing block is set to be thinner than a thickness of the substrate.

As material of the substrate 1 used in the optical waveguide device of the present invention, a ferroelectric material having an electro-optic effect, specifically, substrates such as lithium niobate (LN), lithium tantalate (LT), and lead lanthanum zirconate titanate (PLZT) and vapor deposition films made of these materials can be used. Further, various materials such as semiconductor materials and organic materials can also be used for substrates of optical waveguide devices.

The thickness of the substrate 1 on which the optical waveguide is formed may be set to 10 μm or less, more preferably 5 μm or less in order to perform velocity matching of the microwave and the light wave of the modulation signal. In such a case, in order to reinforce the mechanical strength of the substrate 1, a reinforcing substrate having a thickness of 0.2 to 1 mm is directly joined or bonded via an adhesive.

In the optical waveguide device of the present invention, the "the substrate on which the optical waveguide is formed" means not only one substrate, but also a concept including a joint body of the thin plate on which the optical waveguide is formed (for example, a thickness of 10 μm or less) and a reinforcing substrate that supports the thin plate.

The "the substrate on which the optical waveguide is formed" includes a substrate in which a vapor deposition film is formed on a reinforcing substrate and the film is machined into the shape of the optical waveguide.

As a method of forming the optical waveguide on the substrate 1, a method of thermally diffusing a high refractive index material such as Ti on the substrate or a method of forming a high refractive index portion by a proton exchange method can be used. It is also possible to form a rib-type optical waveguide in which a portion of the substrate corresponding to the optical waveguide is made convex, by a method of etching a substrate portion other than the optical waveguide or a method of forming grooves on both sides of the optical waveguide. Further, it is also possible to use a rib-type optical waveguide and an optical waveguide made by a thermal diffusion method or the like together.

A reinforcing block using LN or the like which is the same material as the substrate 1 is disposed and fixed on the upper portion of the substrate 1 on the end surface side. The end surface (the surface on the same side as the end surface of the substrate 1) of the reinforcing block 10 is used as a joining surface for adhering optical components such as an optical block.

The optical component includes an optical block that holds an optical lens, a reflecting member, a polarizer, and the like, a sleeve-type (cylindrical) holding member that holds the vicinity of the end of the optical fiber, a V-groove substrate, and the like. As materials that make up the optical component, a glass material such as organic glass or optical glass or a plastic material is used.

The LN substrate has a linear expansion coefficient of $4.0 \times 10^{-6}/°$ C. in the Z-axis direction and $14.0 \times 10^{-6}/°$ C. in the X-axis (Y-axis) direction. When the optical component is made of, for example, an optical glass material, the linear expansion coefficient is $6.4 \times 10^{-6}/°$ C. When the optical component is attached to the LN substrate, and the X-axis or the Y-axis is present on the joining surface of the LN substrate, the difference in the two linear expansion coefficients is $5.0 \times 10^{-6}/°$ C. or more and the difference becomes remarkable. As a result, displacement of the optical component, or peeling off or falling off of the optical component occurs due to changes in the temperature of the substrate or the environment.

Further, as the case such as metal for housing the optical waveguide device, a material having a linear expansion coefficient close to that of the substrate used for the optical waveguide device is selected. In the case of an LN substrate, stainless steel is often used, and the linear expansion coefficient of stainless steel is $17.3 \times 10^{-6}/°$ C., and the difference in the linear expansion coefficient from the linear expansion coefficient of the optical component is large, so that the optical component is not joined to the case, but is held exclusively by being joined to the substrate 1 and the reinforcing block 10.

Figure 4:
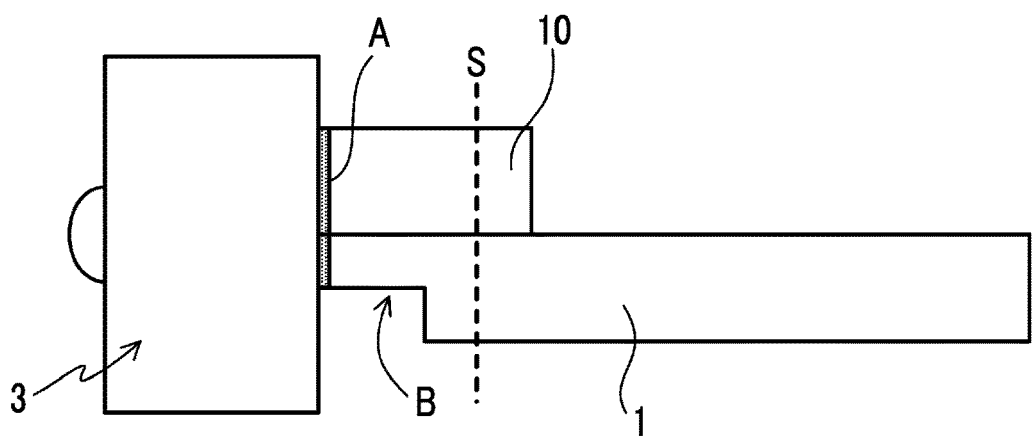
FIG. 4 is a side view illustrating a first embodiment of an optical waveguide device of the present invention.
Figure 5:
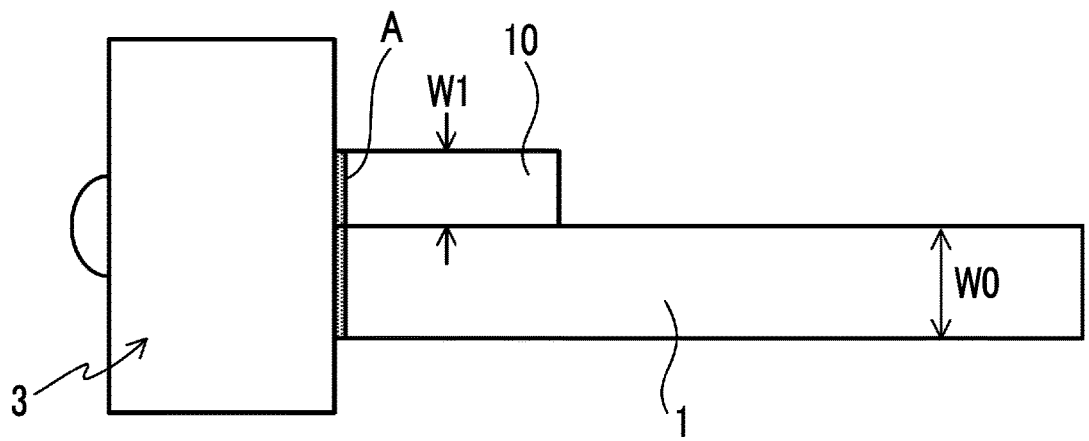
FIG. 5 is a side view illustrating a second embodiment of the optical waveguide device of the present invention.

As shown in FIGS. 4, 6 to 12, the feature of the optical waveguide device of the present invention is that the area of the surface A where the substrate 1, the reinforcing block 10 and the optical component 3 are joined is set to be smaller than a maximum value of the total of the areas of the cross sections of the substrate and the reinforcing block parallel to the joining surface (cross section as a reference numeral S in the drawings). Further, as shown in FIG. 5, the thickness W1 of the reinforcing block 10 may be set to be thinner than the thickness W0 of the substrate 1.

The positions of the reference numerals S shown in FIGS. 4 and 6 to 12 are positions where the "notch" according to the present invention is not provided, and there is no particular limitation in the position as long as the area of the cross section at the location of the reference numerals S is the largest in the substrate 1 and the reinforcing block 10.

Further, when the substrate has anisotropy of the linear expansion coefficient on the joining surface, it is more effective to reduce the area such that the axial dimension having a large difference in the linear expansion coefficient from the optical component becomes small. In particular, when the LN substrate of the X plate (Y propagation) used for the optical modulator is used and bonded to the glass material, the difference in the linear expansion coefficient in the crystal X-axis (thickness direction) rather than the crystal Z-axis (width direction) becomes larger. Therefore, it is more effective to reduce the area by reducing the dimension in the thickness direction.

Figure 11:
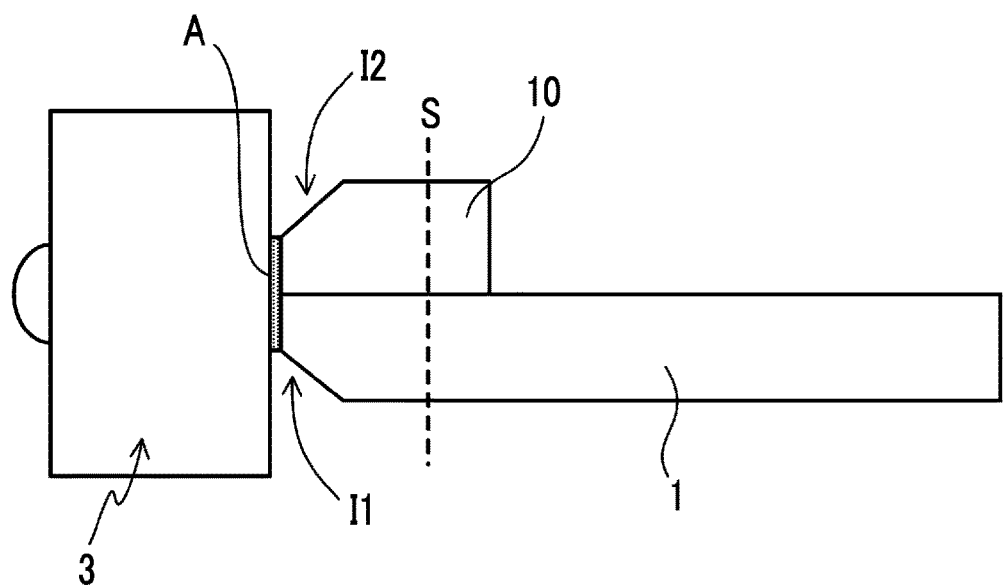
FIG. 11 is a side view illustrating an eighth embodiment of the optical waveguide device of the present invention.
Figure 12:
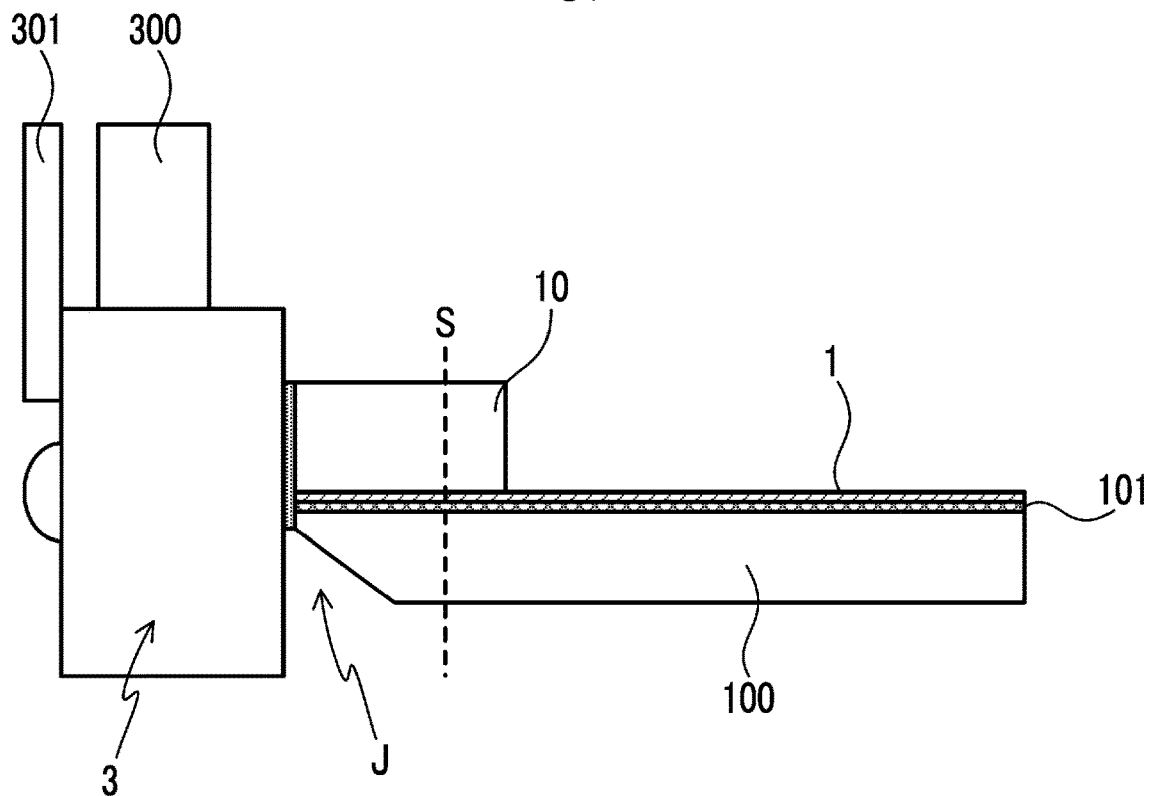
FIG. 12 is a side view illustrating a ninth embodiment of the optical waveguide device of the present invention.

In this way, by making the area of the joining surface A smaller, it is possible to reduce the internal stress generated on the joining surface. In FIG. 4, as a specific method, a notch B (B') is formed in the substrate 1 to reduce the area related to the joining (reference numeral A portion) of the substrate 1. The notch can also be formed by forming a chip after grooving the back surface in a batch in a wafer state before cutting into individual element chips. Such a method is suitable for increasing productivity. As shown in FIG. 4, the position where the notch B is formed is set so as to reduce the thickness of the substrate 1. Further, in FIG. 8, notches (E1 and E2) are formed so as to reduce the widths of the substrate 1 and the reinforcing block. In FIGS. 11 and 12, notches (I1, I2, J) obtained by cutting the substrate 1, the reinforcing block 10 or the reinforcing substrate 100 in an oblique direction are provided. Such a notch is suitable for increasing productivity because the notch can be easily processed by bring a cutting tool into contact with the side surface (excluding the joining surface, and including the bottom surface or the upper surface) of the substrate, the reinforcing block, or the like.

As shown in FIG. 11 or 12, in the case of the notch cut in the oblique direction, the average thickness of the substrate 1, the reinforcing block 10 or the reinforcing substrate 100 can be increased as compared with FIG. 4, and the mechanical strength can be increased. Moreover, since there are no concave corners in the notch as shown in FIG. 4, it is possible to suppress the concentration of stress on the corners and suppress the frequency of occurrence of cracks in the substrate 1, the reinforcing block 10 or the reinforcing substrate 100.

Further, since a cavity (groove or the like) that does not contribute to joining is not formed inside the joining surface, it can be fixed more reliably in a narrow joining area. The reinforcing block 10 in FIG. 5 may be prepared in advance for the reinforcing block 10, or a thick plate to be a reinforcing block may be attached to the substrate 1 and then cut to make it thinner.

Figure 6:
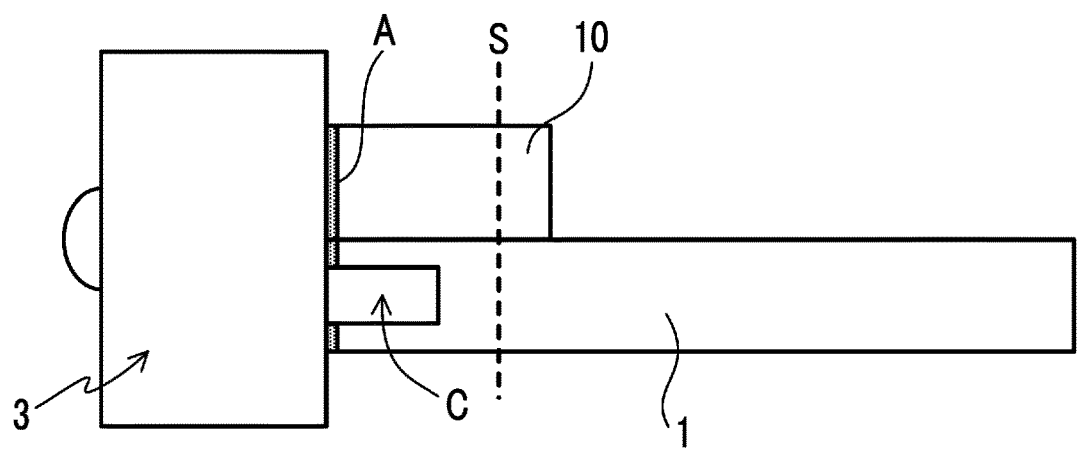
FIG. 6 is a side view illustrating a third embodiment of the optical waveguide device of the present invention.
Figure 7:
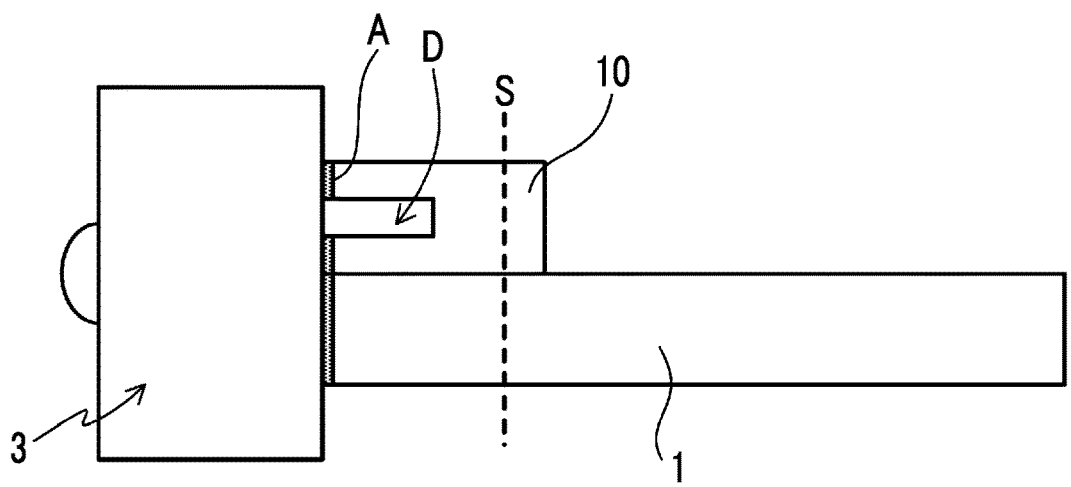
FIG. 7 is a side view illustrating a fourth embodiment of the optical waveguide device of the present invention.
Figure 9:
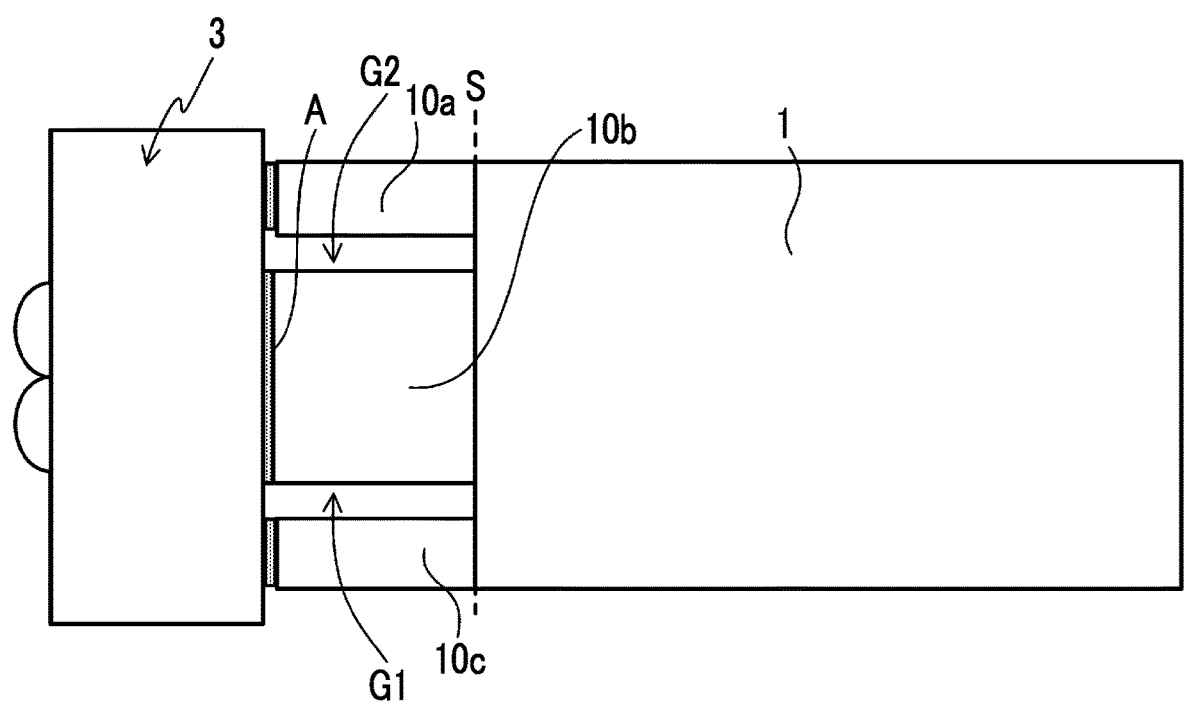
FIG. 9 is a plan view illustrating a sixth embodiment of the optical waveguide device of the present invention.

In FIG. 6, a notch C is formed by cutting from the end surface (joining surface A) side of the substrate 1 with a blade or the like. In FIG. 7, cutting is performed in the end surface of the reinforcing block 10. In FIG. 9, notches (G1, G2) are formed in the inside in the width direction of the substrate 1 and the reinforcing block, in the direction perpendicular to FIG. 9. Although a plurality of notches or slits are formed in FIGS. 9 to 11, only one of these may be formed.

As shown in FIGS. 6, 7, and 9, the position where the notch is formed is set such that the maximum width or the maximum thickness remains in the cross section of the dotted line S portion of the substrate 1 and the reinforcing block 10. With this configuration, in the joining surface A, it is possible to reduce the joining area of each joining surface while the joining surface spreads over a region having a maximum width or a maximum thickness. Since the optical component can be held in a wide range, it is possible to increase the mechanical strength related to the joining while suppressing the occurrence of inclination when the optical component is bonded.

The notch is provided by performing cutting at a position where the widths and heights of the substrate 1 and the reinforcing block 10 are reduced in the direction in which the difference in the linear expansion coefficient is large. For example, FIGS. 6 and 7 show a measure for dealing with the difference in the linear expansion coefficient in the thickness direction of the substrate 1. Further, FIG. 9 is a measure for dealing with the difference in the linear expansion coefficient in the width direction of the substrate 1. The same concept can be applied to FIGS. 4, 5, 8, 11 and 12.

Figure 8:
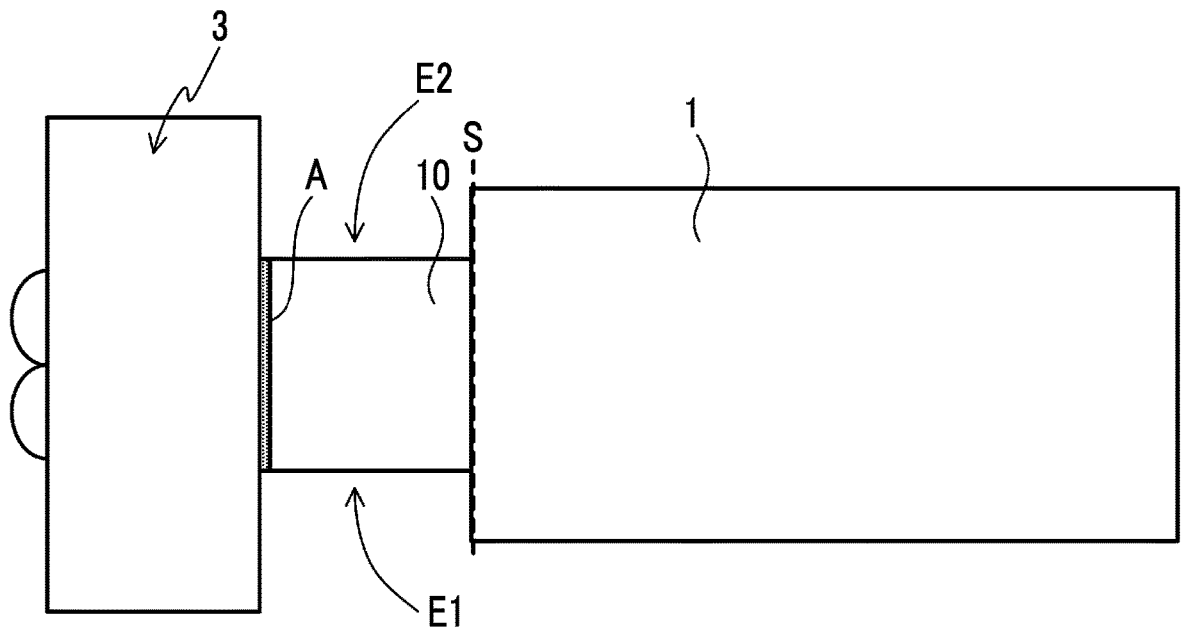
FIG. 8 is a plan view illustrating a fifth embodiment of the optical waveguide device of the present invention.
Figure 10:
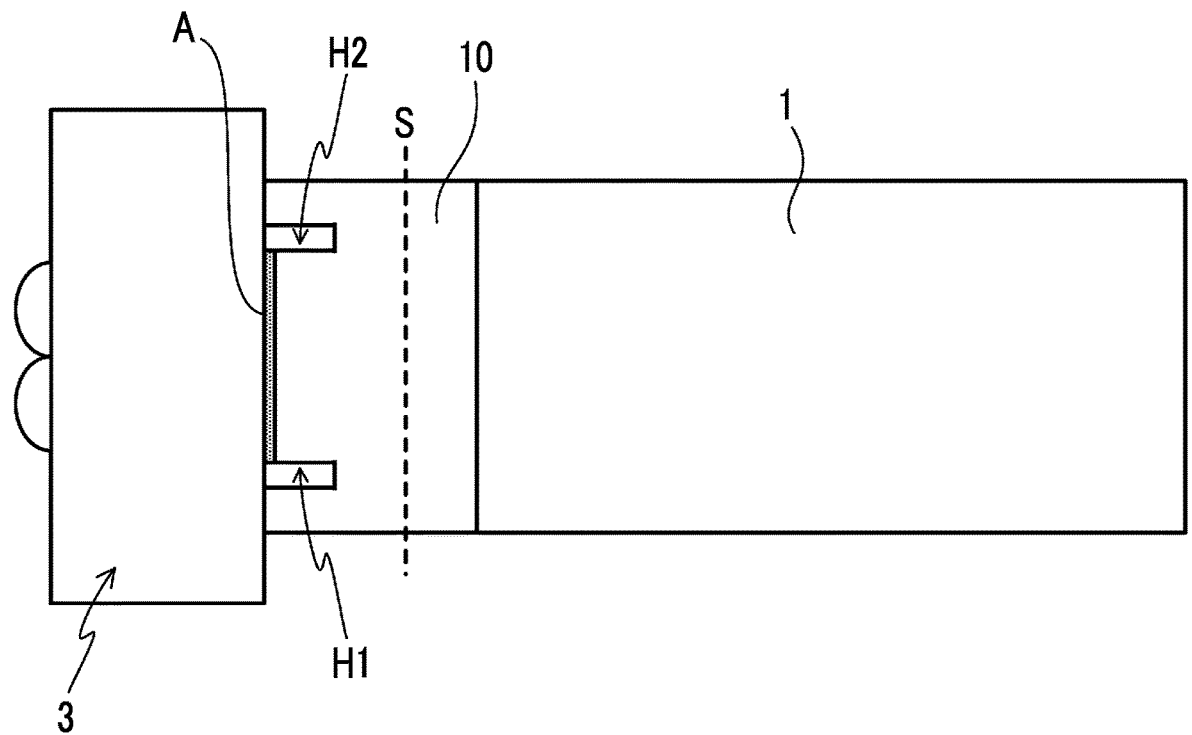
FIG. 10 is a plan view illustrating a seventh embodiment of the optical waveguide device of the present invention.

In FIG. 10, a notch from the joining surface A side is provided in a slit shape (H1 and H2). The joining surface A is formed between the slits (H1 and H2), and the slits suppress the spread of the adhesive in the width direction. In this way, it is possible to reduce the joining area by making the area to which the adhesive is applied narrow. In this case, although the adhesive strength is lower than that in the case of FIG. 9, the generation of stress can be further reduced. Further, as compared with the configuration as shown in FIG. 8, since the optical component and the substrate are close to each other in a wide range, it is possible to suppress the occurrence of inclination of the component when the optical component is bonded.

In FIG. 12, as the "substrate on which the optical waveguide is formed", a joint body is formed in which the thin plate 3 of the LN and the reinforcing substrate 100 are integrally bonded by the adhesive layer 101. Then, the notch J is formed in the reinforcing substrate 100. The angle of the notch can be set to any angle such as 45 degrees, for example.

The optical block 3, which is an optical component, is sucked by the suction jig 300 and conveyed and is brought into contact with the end surface of the substrate 1 or the reinforcing block 10 coated with an adhesive. Since the suction portion of the optical block 3 by the suction jig 300 is $\varphi 0.5$ mm to $\varphi 1.0$ mm, the suction portion occupies a large area on the upper surface of the optical block, and it may be difficult to handle the optical component.

Therefore, there may be no step at the boundary between the upper surface of the optical block 3 and the upper surface of the reinforcing block 10. Thus, the suction jig 300 does not hit the reinforcing block, which facilitates the joining work of the optical components. Further, it is more preferable that the position of the upper surface of the optical component (optical block) 3 is higher than the position of the upper surface of the reinforcing block 10. In this case, since the adhesive that has squeezed out when the optical block 3 is attached cannot proceed to the upper surface of the optical block 3, the suction of the adhesive by the suction jig 300 can be suppressed, and the optical component joining work becomes even easier.

The optical block 3 is lightly pressed in the direction of the substrate 1 by the pressing means 301 with a weight sensor, and the optical block 3 is joined to the end surface of the substrate 1 or the like at an appropriate position. As described above, it is difficult to miniaturize the optical block itself in order to secure an area in contact with the jig that handles the optical block. Therefore, a technique of processing the substrate 1 and the reinforcing block 10 to reduce the joining area, such as the optical waveguide device of the present invention, is particularly useful.

Figure 13:
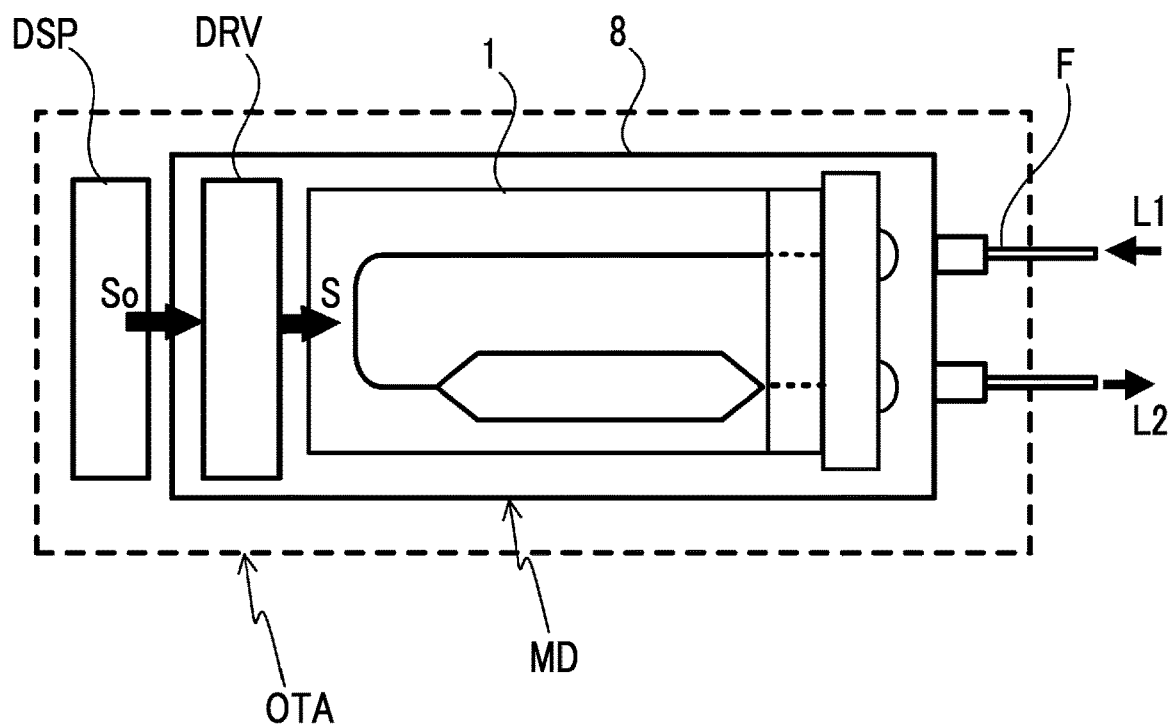
FIG. 13 is a plan view illustrating an optical modulation device and an optical transmission device of the present invention.

The optical waveguide device of the present invention is provided with a modulation electrode that modulates a light wave propagating through the optical waveguide on a substrate 1, and is housed in a case 8 as shown in FIG. 1 or FIG. 13. Further, an optical modulation device MD can be configured by providing the optical fiber (F1, F2, or F) for inputting and outputting light waves to or from the optical waveguide. The optical fiber is not only disposed outside the case 8 as shown in FIG. 1 or FIG. 13, but also is disposed and fixed by introducing the optical fiber into the case through a through-hole penetrating the side wall of the case.

An optical transmission device OTA can be configured by connecting an electronic circuit (digital signal processor DSP) that outputs a modulation signal that causes the optical modulation device MD to perform a modulation operation to the optical modulation device MD. Since the modulation signal applied to the optical waveguide device needs to be amplified, the driver circuit DRV is used. The driver circuit DRV and digital signal processor DSP can also be disposed outside the case 4, but can be disposed in the case 4. In particular, by disposing the driver circuit DRV in the case, it is possible to further reduce the propagation loss of the modulation signal from the driver circuit.

As described above, according to the present invention, it is possible to provide an optical waveguide device in which the internal stress generated at the joining portion between the substrate or the reinforcing block and the optical block is reduced. Further, it is possible to provide an optical modulation device and an optical transmission device using the optical waveguide device.

What is claimed is:

1. An optical waveguide device comprising:
    a substrate on which an optical waveguide is formed; and
    a reinforcing block disposed on the substrate, along an end surface of the substrate on which an input portion or an output portion of the optical waveguide is disposed, wherein
    an optical component that is joined to both the end surface of the substrate and an end surface of the reinforcing block is provided,
    a material used for a joining surface of the optical component and a material used for the substrate or the reinforcing block have at least different linear expansion coefficients of a direction parallel to the joining surface,
    an area of the joining surface is set to be smaller than a maximum value of a total of areas of cross sections of the substrate and the reinforcing block parallel to the joining surface, and
    a notch is formed in the end surface of either the substrate or the reinforcing block, to reduce the area of the joining surface.

2. The optical waveguide device according to claim 1, wherein a position where the notch is formed is set such that a maximum width or a maximum thickness remains in a joining surface of the substrate or the reinforcing block.

3. The optical waveguide device according to claim 1, wherein a position where the notch is formed is set so as to reduce a width or a thickness of the substrate or the reinforcing block.

4. The optical waveguide device according to claim 1, wherein the substrate on which the optical waveguide is formed is a joint body of a thin plate on which the optical waveguide is formed and a reinforcing substrate that supports the thin plate.

5. An optical modulation device comprising:
    the optical waveguide device according to claim 1, which includes an electrode that modulates a light wave propagating through the optical waveguide, and is housed in a case; and
    an optical fiber that inputs the light wave to the optical waveguide or outputs the light wave from the optical waveguide.

6. The optical modulation device according to claim 5, further comprising:
    an electronic circuit that amplifies a modulation signal to be input to the optical waveguide device inside the case.

7. An optical transmission device comprising:
    the optical modulation device according to claim 5; and
    an electronic circuit that output a modulation signal for causing the optical modulation device to perform a modulation operation.

* * * * *